(No Model.)  3 Sheets—Sheet 1.
J. M. ELLIOT.
PHOTOGRAPHIC CAMERA.
No. 569,328. Patented Oct. 13, 1896.
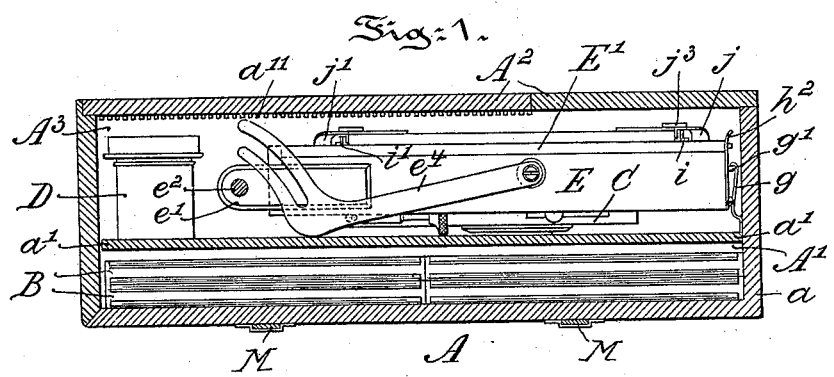
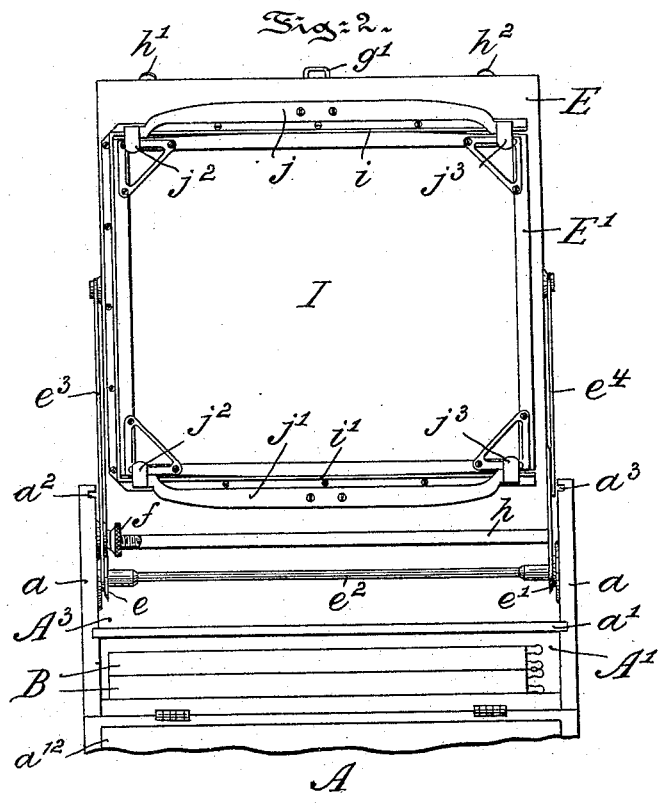
Witnesses:
Richard C. Maxwell
Thomas M. Smith
Inventor:
Joseph M. Elliot,
By J. Walter Douglass
Attorney.
THE NORRIS PETERS CO., PHOTO-LITHO., WASHINGTON, D. C.

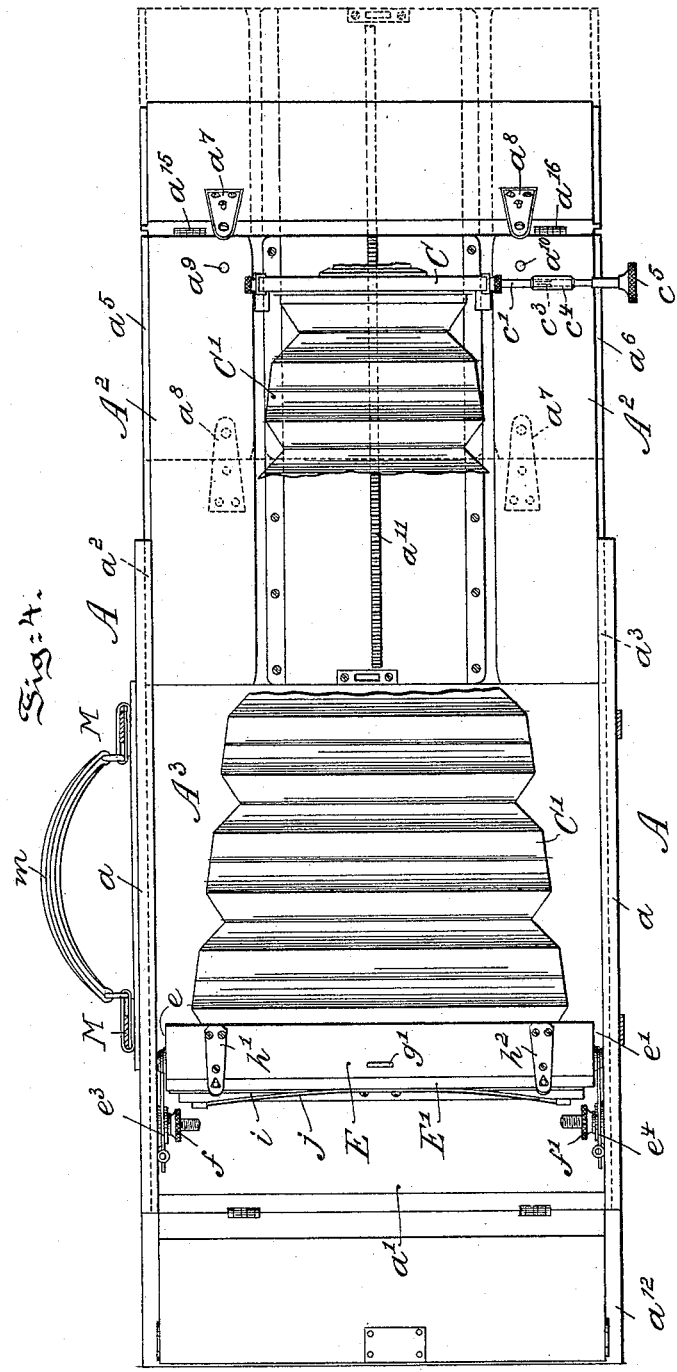

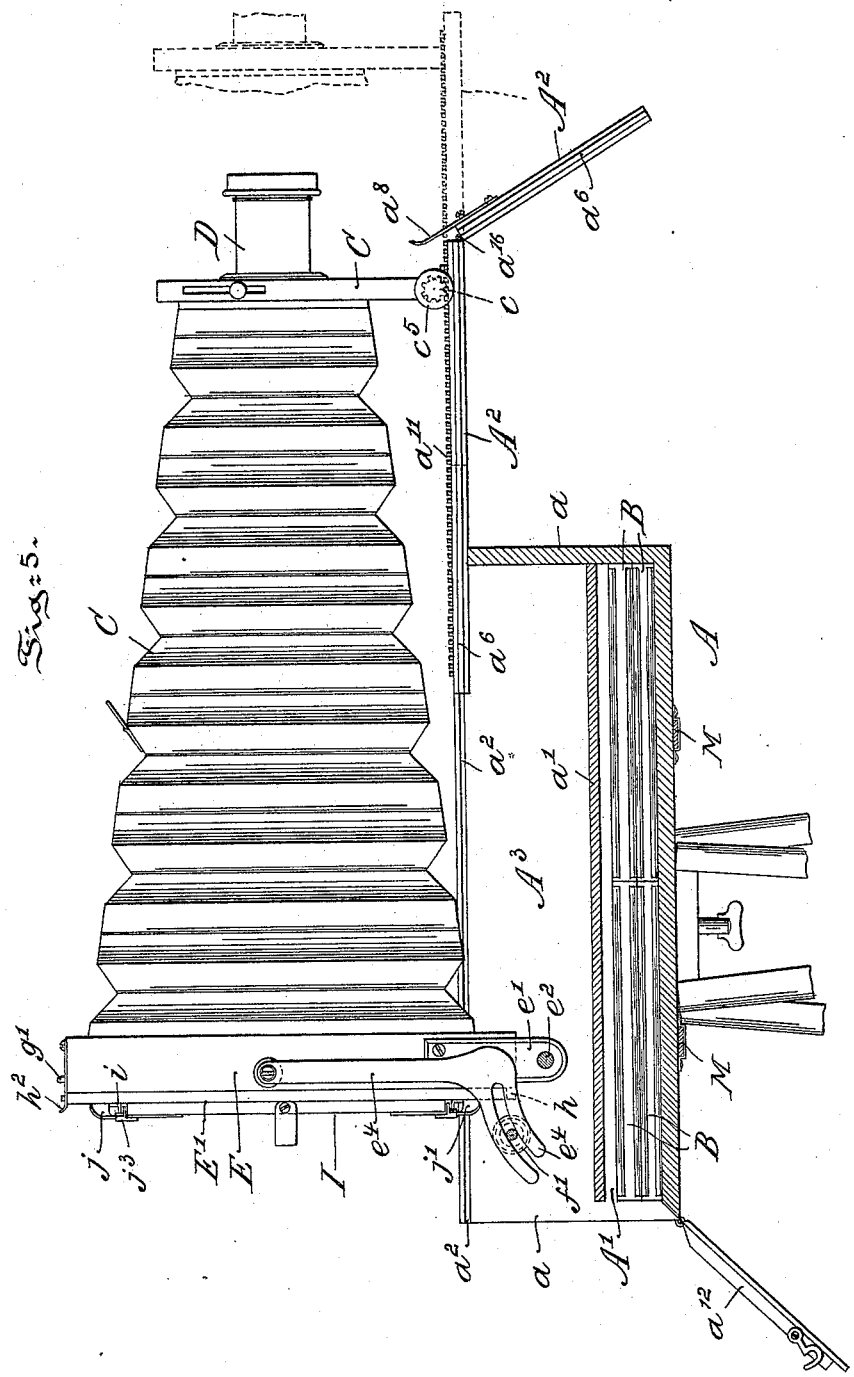

UNITED STATES PATENT OFFICE.

JOSEPH M. ELLIOT, OF PHILADELPHIA, PENNSYLVANIA.

PHOTOGRAPHIC CAMERA.

SPECIFICATION forming part of Letters Patent No. 569,328, dated October 13, 1896.

Application filed February 10, 1896. Serial No. 578,676. (No model.)

*To all whom it may concern:*

Be it known that I, JOSEPH M. ELLIOT, a citizen of the United States, residing at the city of Philadelphia, in the county of Philadelphia and State of Pennsylvania, have invented certain new and useful Improvements in Portable Holders and Supports for Photographic Cameras and the Accessories Thereof, of which the following is a specification.

My invention relates to a portable holder, as well as support, for containing a photographic camera and the accessories thereof, that is to say, the lens, the plate-holders, &c.; and in such connection it relates particularly to the general construction and arrangement of a compact and portable holder, as well as a support for the said purposes.

The principal objects of my invention are, first, to provide a holder and support for a photographic camera which is simple, durable, light in weight, readily handled, and wherein the camera is concealed when not in use and can be readily caused to assume a position for the taking of photographs, in which the parts of the holder are utilized in the mounting of the camera and a convenient receptacle provided therein for plates employed in the camera; second, to provide a holder and support for a camera adapted to be concealed within the same and to be readily withdrawn therefrom, and the detachable member of said holder adapted to be brought into a position in which proper focusing or extension of the bellows of the camera is afforded; third, to provide a holder and support for a camera detachably connected therewith and folding into the interior and latched thereto and with an apartment therein for the reception of plate-holders, as well as the objective of the camera, the said holder provided with a drop member and with a detachable member in sliding engagement with the holder proper and parted to assume either a flat plane or planes at right angles to one another, and said member reversible and provided with a rack adapted to engage a pinion of the bellows member of the camera for extending the same to derive the proper focus for photographing.

My invention, stated in general terms, consists of a holder or support for a camera and its accessories constructed and arranged in substantially the manner hereinafter described and claimed.

The nature, characteristic features, and scope of my present invention will be more fully understood from the following description, taken in connection with the accompanying drawings, forming part hereof, and in which—

Figure 1 is a longitudinal sectional view through a holder, showing the camera and its accessories concealed therein, embodying characteristic features of my present invention. Fig. 2 is an end view of the camera in an elevated position, showing the rear thereof, the lower compartment of the holder with the plate-holders therein and the the folding end of the holder depending therefrom and shown in this view in broken section. Fig. 3 is a front elevational view, detached, of the rack and pinion, the rack being shown in connection with the under side of the lid in cross-section in this view and adapted to engage with the pinion of the bellows-frame of the camera of Fig. 2. Fig. 4 is a top or plan view of the camera-holder, showing the camera with its bellows and accessories in an elevated position with the end flap of the holder extended and with the lid or cover of the box-shaped holder, in connection with the channeled sides thereof, and the bellows with its framework extended and in connection with the rack and pinion for controlling the movement thereof; and Fig. 5 is a longitudinal section through the said holder and its accessories of Fig. 4.

Referring to the drawings, A represents the holder, consisting of two members, whereof $a$ is the oblong box-shaped member, divided internally by a partition $a'$, extending the length thereof, for the reception beneath the same in the compartment $A'$ of plate-holders B, adapted to be introduced into the camera. The sides of the member $a$ of the holder are provided with channels or ways $a^2$ and $a^3$, near the upper ends thereof, through which is adapted to be slid the lid or cover $A^2$ of the box-shaped holder. The lid or cover $A^2$ is provided on the ends with complemental tongues or feathers $a^5$ and $a^6$, adapted to engage the grooves, channels, or ways $a^2$ and $a^3$ of the box-shaped member $a$, which latter is adapted to conceal the camera, bellows, and objective when not in use. On the under side of the cover or lid $A^2$, preferably divided in two by means of hinges $a^{15}$ and $a^{16}$, are flat springs $a^7$ and $a^8$, adapted to engage buttons $a^9$ and $a^{10}$ of said lid for forming a spring clamp connection of the hinge portion with the fixed portion of the lid or cover $A^2$, for a purpose to be hereinafter more fully explained.

$a^{11}$ is a rack connected with the under side of the said lid or cover and adapted to mesh with a pinion $c$, mounted on a cross shaft or rod $c'$, connected with the framework C of the bellows $C'$, which is also provided with an opening to receive the objective or lens D of the camera. This rod or shaft, on one side thereof $c^2$, is extended and hinged at $c^3$, so that the same may be folded inwardly. This shaft or rod $c'$ is provided with a sleeve $c^4$, adapted to establish a substantial connection of the hinged members of the rod or shaft $c'$ with each other to permit of the turning of said rod or shaft $c'$, carrying the pinion $c$, and on the end of this shaft is provided a milled button $c^5$ for actuating said rod or shaft $c'$.

The camera E is provided with two supports $e$ and $e'$, engaging a cross-rod $e^2$, secured to the sides $a$ of the box-shaped holder A, and extending therefrom at an acute angle to said supports are slotted curved fingers $e^3$ and $e^4$, adapted to be engaged by jam-nuts $f$ and $f'$, secured to the sides of the box-shaped holder A, for steadying said camera E in its operative or vertical position.

$g$ is a spring-latch secured to the front internally of the camera-holder and adapted to engage a loop $g'$, connected with the top of the camera-framework, as clearly shown in Figs. 1 and 2, to hold said camera with its bellows and lens-holder frame firmly when the same is concealed within the upper compartment $A^3$ of the said holder A. The lower compartment $A^2$ of the said holder is provided for the plate-holders B, and is an oblong one and is separated from the upper compartment for concealing the camera by means of the partition $a'$, as clearly shown in Figs. 1, 2, and 5 of the drawings.

The camera E at the rear end is provided with a removable frame $E'$, which is held in connection with a bottom ledge $h$ and at the top by means of spring-catches $h'$ and $h^2$, and in connection with this frame $E'$ in the rear are provided upper and lower ledges $i$ and $i'$, with which engage a ground-glass or focusing plate I. This plate I is held in firm contact with the surface of the frame $E'$ by means of spring spanning clamps or strips $j$ and $j'$, provided with end fingers $j^2$ and $j^3$, yet at the same time permitting of the ready release, if occasion requires, of the focusing-plate I from its ledges $i$ and $i'$, as hereinbefore explained, by either a rearward movement or a sidewise movement of the same.

Among the advantageous features of my invention may be mentioned, first, that the camera is thoroughly protected when not in use, firmly held in a rigid position as well as the accessories thereof, and is adapted to contain a series of plate-holders, and the whole in a compact and portable form, with the weight correspondingly reduced in comparison with holders as hitherto constructed and marketed, and at the same time the holder is so arranged as that the camera can be readily, without lifting and lowering different parts of the holder, brought into a position in which it can be employed for the taking of a photographic negative, for the reason that upon the dropping of the rear member $a^{12}$ of the holder and the release of the lid and the detachment of the camera from its spring-catch within the box-shaped member the same can be elevated to assume the required operative position by the insertion of the lid into the channeled sides of the holder, and the bellows of the camera be extended by the rack and pinion to obtain the required focus. The lid at the same time is so arranged as that any desired extension of the bellows can be readily obtained, and that portion of the lid which might interfere with the photograph can be thrown out of view by the dropping of the same, due to the hinged connection established between the two portions of said lid; second, the holder is so arranged as that when the camera has assumed the proper position in its hinged or pivotal connection with the holder the plates can be readily withdrawn from the compartment $A'$ and mounted in the camera for the taking of the photograph and with a comparatively free use of the hands for manipulating the camera in order to derive the results required, and, third, when the photograph-negative has been obtained by withdrawing the bellows from the position it occupies and removing the lid the camera can be caused to assume the position illustrated in Fig. 1 of the drawings, the lid then reversed and introduced into the channeled ways of the holder, and the end drop-flap $a^{12}$ raised in connection with the lid, so as to close against the holder and with the camera and its accessories concealed therein, together with the plate-holders mounted in the compartment $A'$. This box may be provided with straps M to surround the same and with a handle $m$, in order that the holder A, with its contents, may be readily carried from place to place in the hand.

It will be manifestly obvious that as to minor details modifications may be made without departing from the spirit or scope of my invention, and hence I do not wish to be understood as limiting myself to the precise construction and arrangement of all the parts as hereinbefore explained; but,

Having thus described the nature and objects of my invention, what I claim as new, and desire to secure by Letters Patent, is—

1. A camera holder and support, consisting of a box provided with an internal partition dividing the same into two compartments, one to receive a camera and its accessories and the other plate-holders, a removable two-part lid adapted to be slid in the sides of said box and provided with a rack, and a pinion connected with the bellows of said camera and adapted to be extended by the travel of said pinion in connection with said rack, substantially as and for the purposes set forth.

2. A holder and support for a camera, consisting of an oblong box divided by an internal partition into two compartments, one to receive plate-holders and the other a camera and its accessories, said box provided with a hinged drop and a removable lid adapted to be slid in the sides of said box and provided with a rack adapted to engage a pinion of the bellows-frame of said camera, substantially as and for the purposes set forth.

3. A holder and support for a camera, consisting of a box provided with an internal partition dividing the same into two compartments, one to receive and conceal a camera and its accessories and the other to receive plate-holders, and a lid or cover adapted to be slid in the sides of said box and provided on one side with a rack, said lid or cover provided also with spring-clamps so as to permit of the fall of said lid or cover, substantially as and for the purposes set forth.

4. A holder and support for a camera, consisting of a box internally divided into two compartments by a partition, one to receive a camera and the other plate-holders, said box provided with an end flap and a removable lid or cover having on one side a rack, said lid or cover hinged at or beyond the center and provided with spring clamping-fingers adapted to engage pins or buttons for holding the same rigidly and to permit of the fall of the same as required, substantially as and for the purposes set forth.

5. A holder and support for a camera, consisting of a box internally divided by a partition into two compartments and having a hinged end flap, a removable lid or cover adapted to be slid in the sides of said box, a camera pivotally connected with the sides of said box and provided with slotted fingers adapted to engage clamps for maintaining said camera in a rigid operative position and means for extending the bellows of said camera in connection with the removable lid of said box, substantially as and for the purposes set forth.

6. A holder and support for a camera, consisting of a box divided into two internal compartments, a removable spring-clipped hinged lid adapted to be slid in the sides of said box, a camera pivotally supported to uprights secured to the sides of said box and having curved slotted arms extending therefrom and adapted to engage clamping means connected with the sides of said box, substantially as and for the purposes set forth.

7. A camera holder and support provided with channeled sides and with a lid or cover provided with a rack, a camera pivotally supported by standards to the sides of said holder and having curved slotted fingers engaging clamps of said holder, a pinion adapted to mesh with said rack and a rod adapted to actuate said pinion and to fold inwardly, when not in operative position, substantially as and for the purposes set forth.

8. The combination, with a holder and support of the character described, of a camera pivotally supported internally therein and adapted to be concealed within the same and to be lifted therefrom into an operative position in connection with a rack and a pinion, said rack connected with a removable cover and the pinion with the lens and bellows frame of the camera, said pinion mounted on a shaft, one portion of which is extended and hinged to another portion, and means for establishing a rigid connection of the hinged portions of said shaft with one another for actuating said pinion in connection with said rack, substantially as and for the purposes set forth.

9. The combination, with a holder and support of the character described, of a camera and its accessories adapted to be concealed within said holder, a partition separating the camera from a compartment for the reception of plate-holders, an end falling flap, a removable lid in channeled engagement with said holder and having the forward portion thereof hinged and adapted to drop upon the release of means connected therewith and with the rear portion of said lid or cover, substantially as and for the purposes set forth.

10. The combination, with a holder and support, of a camera provided with a rear frame resting upon a ledge and provided with spring-clamps for holding the same in required position, a ground or focusing glass engaging said frame and spanning-clamps $j$ and $j'$, secured at the middle to said rear frame and having other portions free and provided at the ends with projecting fingers $j^2$ and $j^3$, adapted to bear normally with a spring-tension against the frame of said ground or focusing glass, substantially as and for the purposes set forth.

11. The combination, with a holder and support of the character described, of a camera pivotally supported therefrom and provided with depending slotted fingers engaging clamps, a spring-latch connected with the forward end internally of said holder and adapted to engage a loop on the top of said camera-frame, substantially as and for the purposes set forth.

In testimony whereof I have hereunto set my signature in the presence of two subscribing witnesses.

JOSEPH M. ELLIOT.

Witnesses:
J. WALTER DOUGLASS,
RICHARD C. MAXWELL.